W. A. BRADLEY.
HANDLE FASTENING.
APPLICATION FILED SEPT. 16, 1909.
981,745.
Patented Jan. 17, 1911.
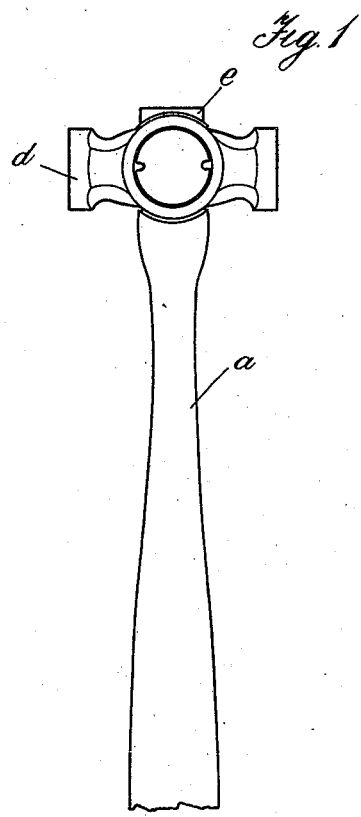
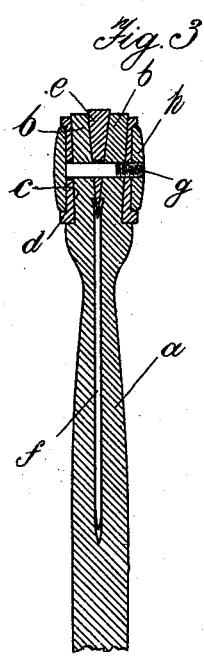
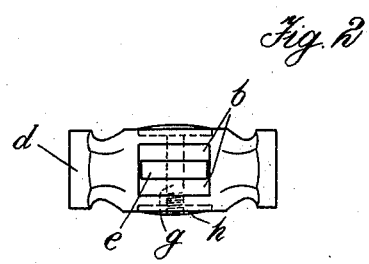
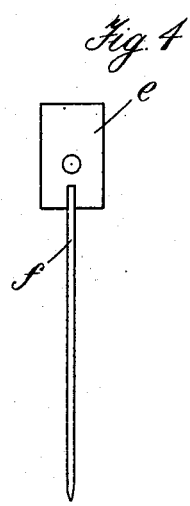
Witnesses.
E. Smith
Inventor
William Arthur Bradley
By Carl Gewes.
His Attorney

UNITED STATES PATENT OFFICE.

WILLIAM ARTHUR BRADLEY, OF DENTON, NEAR MANCHESTER, ENGLAND.

HANDLE-FASTENING.

981,745.  Specification of Letters Patent.  Patented Jan. 17, 1911.

Application filed September 16, 1909. Serial No. 518,085.

*To all whom it may concern:*

Be it known that I, WILLIAM ARTHUR BRADLEY, a subject of the King of England, and resident of Denton, near Manchester, England, have invented a new or Improved Handle-Fastening, of which the following is a specification.

This invention relates to improvements in or relating to a method of and means for securing the heads of hammers, axes, picks and the like to their shafts or handles, the object being to prevent the heads of such tools from working loose and flying off the shaft which now frequently occurs, and also to prevent the shaft or handle breaking at the weak point near the head.

In order that this invention may be fully understood, it will now be described with reference to the accompanying drawing, in which:—

Figure 1 is a side elevation of a hammer showing this invention applied thereto. Fig. 2 is a plan of the same. Fig. 3 is a longitudinal cross section thereof, and Fig. 4 is a detailed view of the wedge and its extension.

According to this invention the shaft, stem or handle $a$ is furnished with an upper forked or bifurcated extremity $b$ designed to enter a tapering recess $c$ in the head of the tool $d$ and between the arms $b$ of the forked extremity of the shaft or handle $a$, wedge-shaped piece $e$ enters, the said wedge-shaped piece being formed with or secured to a downwardly projecting member $f$ (Fig. 4) designed to enter a hollowed portion of the stem or shaft.

In practice the head $d$ of the tool is placed over the forked or bifurcated extremity of the shaft or handle $a$, and the head of the said tool, the arms $b$ of the forked extremity of the shaft and the wedge $e$ having transverse holes or perforations which then coincide and through which is then passed the screw-threaded pin $g$, the extremity of which is engaged by the nut or screw-threaded disk $h$ for securing the whole together, and it is preferred, as aforesaid, to form in the side faces of the tools, recesses wherein the heads of the screw-threaded pin and the nut or screw-threaded disk respectively enter as shown.

Having fully described my invention, what I claim and desire to secure by Letters Patent is:—

An improved means for securing the heads of hammers, axes, picks and such like tools to their shafts or handles, comprising in combination, a tool having a tapering recess in its head, a shaft, the bifurcated extremity of said shaft, the latter being adapted to enter said tapering recess, a wedge-shaped piece designed to enter said bifurcated extremity, a downwardly projecting stem with which said wedge is furnished, a screw-threaded pin adapted to pass through the side faces of said tool, the bifurcated extremity of said shaft and the wedge, and a threaded disk adapted to screw on the threaded end of said pin whereby the various parts are held together, substantially as described and shown, and for the purpose set forth.

In testimony whereof I have hereunto set my hand in the presence of two subscribing witnesses.

WILLIAM ARTHUR BRADLEY.

Witnesses:
 ERNALD SIMPSON MOSELEY,
 MALCOLM SMETHURST.